(12) United States Patent
Sopic et al.

(10) Patent No.: US 12,143,530 B2
(45) Date of Patent: Nov. 12, 2024

(54) SYSTEM AND METHOD FOR CLASSIFYING AND HANDLING VOICE OVER IP TRAFFIC

(71) Applicant: Sandvine Corporation, Waterloo (CA)

(72) Inventors: Marko Sopic, Dubai (AE); Alexander Osman, Dubai (AE); Robert Oreb, Dubai (AE); Elie El Khoury, Atchaneh Metn (LB)

( * ) Notice: Subject to any disclaimer, the term of this patent is extended or adjusted under 35 U.S.C. 154(b) by 347 days.

(21) Appl. No.: 17/380,299

(22) Filed: Jul. 20, 2021

(65) Prior Publication Data
US 2022/0103680 A1   Mar. 31, 2022

Related U.S. Application Data

(60) Provisional application No. 63/084,745, filed on Sep. 29, 2020.

(51) Int. Cl.
| | |
|---|---|
| *H04M 3/22* | (2006.01) |
| *H04L 12/14* | (2006.01) |
| *H04M 7/00* | (2006.01) |

(52) U.S. Cl.
CPC ...... *H04M 3/2281* (2013.01); *H04L 12/1482* (2013.01); *H04M 7/006* (2013.01)

(58) Field of Classification Search
CPC .............................. H04M 3/2281; H04M 7/006
(Continued)

(56) References Cited

U.S. PATENT DOCUMENTS

| | | | |
|---|---|---|---|
| 10,181,049 B1 * | 1/2019 | El Defrawy | H04L 9/085 |
| 2005/0041584 A1 * | 2/2005 | Lau | H04L 47/10 |
| | | | 370/235 |

(Continued)

FOREIGN PATENT DOCUMENTS

| | | | | |
|---|---|---|---|---|
| CA | 2783988 A1 * | 5/2011 | ........ | H04M 1/72541 |
| CN | 111061845 A * | 4/2020 | | |

(Continued)

OTHER PUBLICATIONS

Joshi, A. V. et al., Analyzing CDR/IPDR data to find People Network from Encrypted Messaging Services, Proceedings of 1-CAPCHA Workshop, IEEE International Conference on Collaboration and Internet Computing (CIC 2018), 7 pages. Accessed Dec. 10, 2021 and available from https://arxiv.org/pdf/1809.09747v3.

(Continued)

*Primary Examiner* — David R Lazaro
*Assistant Examiner* — Mariegeorges A Henry
(74) *Attorney, Agent, or Firm* — Amarok IP Inc.; Neil W. Henderson

(57) ABSTRACT

A system and method for handling Voice over Internet Protocol (VoIP) traffic flows on a computer network, and, in particular, encrypted VoIP traffic flows. The method including: collecting traffic flow data with respect to an IP session; collecting parameters associated with the IP session; determining whether the IP session is a VoIP session; correlating IP sessions having similar parameters to the collected parameters; and creating at least one Internet Protocol Detail Record (IPDR) or Call Detail Record (CDR) based on the correlated IP sessions. The system including: a collection module configured to collect traffic flow data; an analysis module configured to determine parameters and determine whether the IP session is a VoIP session; and a correlation module configured to correlate IP sessions having similar parameters; and create at least one Internet Protocol Detail Record (IPDR) or Call Detail Record (CDR) based on the correlated IP sessions.

20 Claims, 10 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 2012/0270467 | A1* | 10/2012 | Rutherford | .......... A01K 15/025 |
| | | | | 446/188 |
| 2019/0005421 | A1* | 1/2019 | Hammel | .......... G06Q 10/06393 |
| 2020/0274815 | A1 | 8/2020 | Sreevalsan et al. | |

FOREIGN PATENT DOCUMENTS

| | | | | | |
|---|---|---|---|---|---|
| CN | 112383405 A | * | 2/2021 | ............. | H04L 12/14 |
| JP | 5536183 B2 | * | 7/2014 | ............ | H04W 52/10 |

OTHER PUBLICATIONS

Rezaei, S. et al., Deep Learning for Encrypted Traffic Classification: An Overview, IEEE Communications Magazine, vol. 57, No. 5, pp. 76-81, May 2019.

Trivedi, U., A self-learning stateful application identification method for Deep Packet Inspection, 2012 8th International Conference on Computing Technology and Information Management (NCM and ICNIT), 2012, vol. 1, pp. 416-421.

Written Opinion and Search Report, International Searching Authority (PCT), corresponding WO Application No. PCT/CA2021/051359, dated Dec. 17, 2021.

* cited by examiner

| Voice call metadata | Traditional voice call | Encrypted VoIP - WhatsApp |
|---|---|---|
| Caller A | Available | Not Available |
| Caller B | Available | Not Available |
| Call flow (e.g. call forward) | Available | Not Available |
| Call pickup time | Available | Not Available |
| Call duration | Available | Not Available |
| Call quality parameters | Available | Not Available |
| Caller A location | Available | Not Available |
| Caller B location | Available | Not Available |

FIG. 1

| Attribute | Domestic call | International call | Multiple calls *** |
|---|---|---|---|
| | | User B is abroad | Two calls happening same time |
| Caller A (MSISDN/IMEI/IMSI) | Available | Available | Available |
| Caller B (MSISDN/IMEI/IMSI) | Available | Available | Available |
| Call duration | Available | Available | Available |
| Location A | Available | Available | Available |
| Location B | Available | Available | Available |

FIG. 2

| Key IPDR Attributes | User A record | User B record |
|---|---|---|
| Timestamp | Time | Time |
| Client IP | User A | User B |
| Server IP | OTT App Server (X) | OTT App Server (Y) |
| Protocol | OTT App specific (voice flavor) | OTT App specific (voice flavor) |
| Location | Cell ID User A/DSLAM (fixed) | Cell ID User B/DSLAM (fixed) |
| MSISDN/IMEI/IMSI/ADSL username | User A | User B |
| Call duration | Seconds | Seconds |
| Amount of data | Bytes | Bytes |

FIG. 4

| Identity | Mobile | | Fixed |
|---|---|---|---|
| | MSISDN | | Username (e.g. ADSL) |
| | IMEI | | |
| | IMSI | | |
| Location | Access point (Cell ID) | | Access point (e.g. DSLAM) |

FIG. 9

SYSTEM AND METHOD FOR CLASSIFYING AND HANDLING VOICE OVER IP TRAFFIC

RELATED APPLICATION

The present disclosure claims benefit to U.S. Provisional Patent Application No. 63/084,745 filed Sep. 29, 2020, which is hereby incorporated in its entirety herein.

FIELD

The present disclosure relates generally to classifying and handling of computer network traffic. More particularly, the present disclosure relates to a system and method for classifying and handling of Voice over Internet Protocol (VoIP) traffic, including when encrypted.

BACKGROUND

Internet Data traffic continues to grow and is becoming increasingly encrypted in nature, with over 50% of internet traffic already encrypted and the number rising to 80% in developed markets. Advanced encryption protocols such as TLS 1.3, Encrypted SNI and Encrypted DNS are either being adopted now or will be widely adopted in the near future. At the same time, network operators continue to need to understand what applications and services are being transmitted over the network(s) they operate in order to perform a variety of tasks, such as, but not limited, to ensuring quality of experience, congestion management, advanced data services and billing and charging related services including data fraud detection. In the face of increased encryption, accurately identifying the services in use is a challenge.

Meta data (data points) such as IP addresses, hostnames, SNI (Server Name Identification), SSL Certificate information, DNS records and HTTP User Agents are traditionally used to allow network operators to classify applications and services. However, with encrypted traffic, some or all of these data points may not be available.

As such, there is a need for an improved system and method for classifying and handling VoIP network traffic, including encrypted VoIP traffic.

The above information is presented only to assist with an understanding of the present disclosure. No determination has been made, and no assertion is made, as to whether any of the above might be applicable as prior art with regard to the present disclosure.

SUMMARY

In a first aspect, there is provided a method for classifying and handling Voice Over Internet Protocol (VoIP) traffic flows on a computer network, the method including: collecting traffic flow data with respect to an IP session; collecting parameters associated with the IP session; determining whether the IP session is a VoIP session; correlating IP sessions having similar parameters to the collected parameters of the VoIP session; and creating at least one Internet Protocol Detail Records (IPDR) or Call Detail Records (CDR) based on the correlated IP session parameters.

In some cases, the method may further include: storing the parameters associated with the VoIP session; receiving a request, from a third party device, to query the stored records based on a parameter of interest; querying the stored parameters to determine at least one record matching with the parameter of interest; and providing any results that match the parameter of interest, to the third party device.

In some cases, the traffic flow may be an encrypted traffic flow.

In some cases, if there is more than one recording matching the parameter of interest, the method may provide an indication that a plurality of records match the parameter of interest.

In some cases, the parameters may include subscriber attributes, call start time, call end time and application type.

In some cases, a record is determined to be a match if the call start time and call end time are within a predetermined time interval of each other.

In some cases, the predetermined time interval is based on a latency metric of the network.

In some cases, the third party device may be associated with a law enforcement authority.

In some cases, storing the parameters associated with the VoIP may include consolidating raw data to generate normalize the data.

In some cases, the method may further include, determining a confidence level of the created record.

In some cases, the IP sessions may originate from the same jurisdiction.

In another aspect, there is provided a system for classifying Voice Over Internet Protocol (VoIP) traffic flows on a computer network, the system including: a collection module configured to collect traffic flow data with respect to an IP session; an analysis module configured collect parameters associated with the IP session to determine whether the IP session is a VoIP session; and a correlation module configured to correlate IP sessions having similar parameters to the collected parameters of the VoIP session; and create at least one Internet Protocol Detail Records (IPDR) or Call Detail Records (CDR) based on the correlated IP session parameters.

In some cases, the analysis module may further be configured to determine whether the traffic flow is an encrypted traffic flow.

In some cases, the system may further include: a memory component configured to store the parameters associated with the VoIP session; and a query module configured to receive a request, from a third party device, to query the stored records based on a parameter of interest, query the stored parameters to determine at least one record matching with the parameter of interest; and provide any results that match the parameter of interest, to the third party device.

In some cases, the query module may be configured to provide an indication that a plurality of records match the parameter of interest if there is more than one record matching the parameter of interest.

In some cases, the parameters may include, subscriber attributes, IP addresses, flow bitmasks, call start time, call end time and application type.

In some cases, a record may be determined to be a match if the call start time and call end time are within a predetermined time interval of each other.

In some cases, the predetermined time interval may be based on a latency metric for the network.

In some cases, the third party device may be associated with a law enforcement authority.

In some cases, the IP sessions may originate from the same jurisdiction.

In some cases, the analysis module may be configured to consolidate raw data to generate normalize the data.

In some cases, the correlation engine may be further configured to determine a confidence level of the created record.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 1 is a table illustrating the delta visibility between traditional voice and encrypted VoIP;

FIG. 2 is a table illustrating the delta visibility between Domestic and International voice and encrypted VoIP;

FIG. 4 is a table illustrating call attributes that may be available in the Internet Protocol Detail Record;

FIG. 9 is a table showing parameters determined at the control plane for both fixed and mobile users;

DETAILED DESCRIPTION

Figure 3:
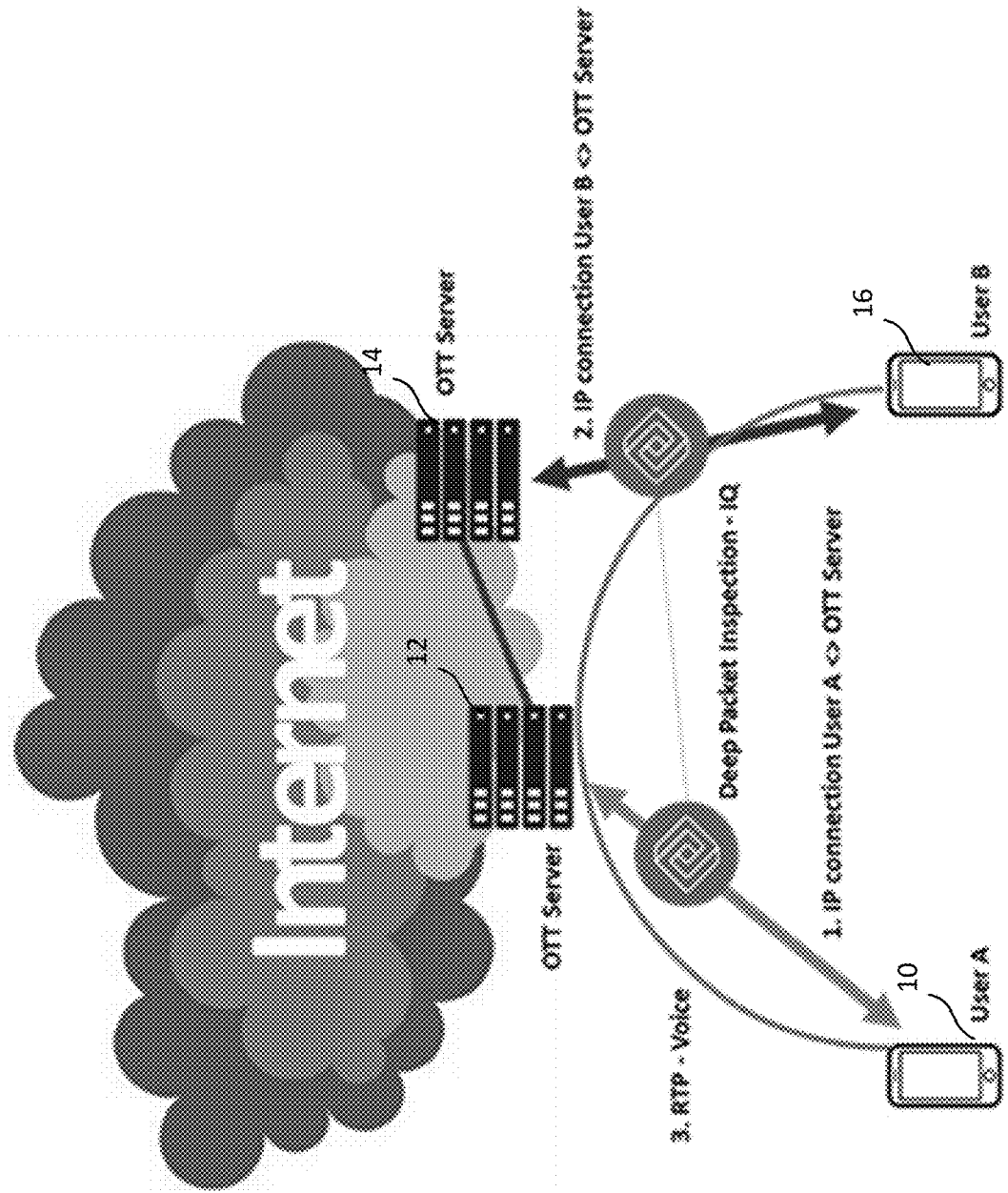
FIG. 3 illustrates a VoIP call in an example scenario.

Generally, the present disclosure provides a method and system for classifying/determining and handling of Voice over Internet Protocol (VoIP) calls in a computer network. In particular, the system is configured to collect traffic flow data and to determine traffic flows related to VoIP calls. For traffic flows related to VoIP calls, the system may determine various parameters or information associated with the call. The system is configured to correlate calls, based on the determined parameters, including, for example, the start time and duration of the VoIP call. The system may also receive queries or requests with respect to a particular user or a particular call from, for example, a legal authority or law enforcement agency. The system is configured to query the stored call information and provided for a matching record if a matching record exists in the database or storage associated with the system. In some cases, the system may provide a plurality of records when a plurality of records match a querying parameter of interest.

There has been a large shift in the course of the last decade from standard voice telephony (voice calls and SMS) towards voice over IP services (Voice and Video over IP, messaging). As content being sent over computer networks is frequently encrypted, the content is hidden from conventional types of interception used in network management (sometimes called "lawful interception"). Conventionally, a focus for lawful interception has been on reconstruction of unencrypted data and solutions available in the market may only provide visibility on a protocol identification level. Application control plane and content itself may not be visible, for example, end to end encrypted, which may be enabling malicious people to engage in easy ways to communicate without being noticed, for example, by law enforcement agencies (LEAs) or the like.

Encrypted text and voice/video platforms are tools that many people use to communicate these days, and it is expected the trends will continue.

In conventional voice networks, within the control plane, intelligence solutions were able to identify parties involved in the call, with additional call metadata, cell tower details, codecs, call duration, call scenario, and the like. With visibility inside described data set, intelligence platforms enabled analysts to identify via user-friendly interfaces communication end points, location whereabouts, relationship analysis and other analytics with respect to the phone call. Those details were able to be used for investigations by network operators, LEAs or the like.

Generally, when a user makes a voice call over an encrypted channel, for example WhatsApp™, or the like, the call related metadata as being part of the application, is generally encrypted. When the traffic is inspected over the wire, it will generally reveal only IP addresses of the user and OTT application server details outside of the country, and count the amount of data for complete application (mixture of voice, messaging, file sharing, browsing). With such poor granularity for conventional metadata extraction, it has become challenging to generate useful information and to differentiate voice calls from various other types of data, including application data.

With encryption, many of the solutions available do not have access to or the ability to extract and generate Call Detail Records (CDRs) for encrypted voice calls, and for that reason, existing solutions may be considered blind in this area. As a result, encrypted communication services analysis may be limited to an application usage and time statistics, which may be the only aspects that are as visible within the existing conventional solutions.

Generally, without understanding various data, such as, at what time a call occurred, over an encrypted channel, it is difficult to produce any information about the call itself. FIG. 1 is a table that illustrates the delta visibility between traditional voice and encrypted VoIP.

With data and voice being mixed over IP communication channels, traditional approaches are often unable to pinpoint the event of the call itself, differentiate between text, file transfer, note, and the like. Traditional approaches may not have the ability to measure call duration, start and stop timestamps, directional flow bitmasks, or other aspects of a call. IP sessions, when encrypted, may only provide visibility in terms of header data up to layer 4 plus protocol classification. When focusing on IP addresses, if those are not specifically assigned to the end users, it is difficult to understand who may be involved in the communication.

In a simplified scenario, when two devices communicate over the same network, and there are known IP addresses for each device, layer 3 header (IP) can reveal devices involved in communication. However, currently, voice over IP services (Over the top (OTT)) work in more complex environments, where communication is relayed over server nodes, and IP sessions often have server IP addresses as destinations. Frequently, the other side of a call is hidden behind the server node, and the recipient IP address will not be visible as their communication is not direct from an IP perspective. IP sessions with available unencrypted information for voice over IP for OTT do not tend to have information about the call nor the other party involved in the call.

Embodiments of the system and method detailed herein are intended to not only identify a call over encrypted IP channels, but also to produce as an end result consolidated CDRs that can be used by, for example, law enforcement agencies on targeted identities. It is intended that the CDR provide for data containing both parties of the call, time details, as well as the callers respective locations, with those attribute sets often being considered important to the targeted group of customers, such as the law enforcement agencies. At the same time, it is helpful to protect regular users from their data being exploited or misused in any way.

As such, embodiments of the system and method are intended to extract data of interest by identifying voice call behavior over encrypted service and collecting relevant parameters. Further, embodiments are intended to provide for data correlation and analytics and are intended to correlate and visualize the data in order to generate useful intelligence.

Embodiments of the system and method are intended to extract data and provide for machine learning and heuristics to take advantage of the available data and create extra value that is not available by relying on protocol signatures. When extracting the data, the system and method may focus on understanding the data and generating precise records when a call is being placed over the encrypted channel, together with call dynamics collected over time. Embodiments of the system and method are intended to provide for relationship, location and anomaly analysis.

FIG. 2 is a table illustrating various capabilities related to different call scenarios, which are detailed herein. In some scenarios, where none of the call data passes through the traffic inspection elements and is routed internally, there may still be little to no visibility into the caller information. In other scenarios, it might be possible to identify the country information, for example, for an outside party. Further, principles detailed herein may provide for identifying situations wherein several people make the OTT voice over IP call in the approximate same time, using same service, and closing the call at the approximate same time. Each party will generate their own set of data, and when correlation takes place, it may result in false positives, as all call parties will be valid CDR candidates. Another example where more than two parties can present matching data for the correlation can be conference call. These outcomes are managed separately as detailed herein.

Embodiments of the system and method are configured to map to at least one Internet Protocol Detail Records (IPDR) as it will be understood that IP is used to establish each leg of a call. From the mapped IPDRs, the system and method are intended to determine call attributes as detailed herein. The system may be deployed inline, and collect data as the traffic flow is ongoing, or may be offline and may receive data from a network device to be analyzed and correlated after the traffic flow has been completed. In some cases, the system may also support data replay or being fed data collected from a third party solution or network device.

FIG. 3 illustrates a VoIP call in an example scenario. User A 10 may initiate a call, establishing a new connection to the OTT application server 12 inside or outside User A's region. Based on the information provided, potentially other OTT server 14 will initiate the call towards User B 16. Once acknowledged, User A and User B will be connected via servers, and dedicated connections will be active during the call. Upon call closure, the servers may generate two or more records (for example, two IPDRs), where one record contains User A calling the outside server details, and the second would be outside server calling User B. Both records are intended to be stored within a data server or other memory component. In cases where either the calling or receiving party is out of the network subscriber region, a single consolidated record may be generated. FIG. 4 is a table illustrating call attributes that may be available in the IPDR. The values of these attributes may be determined by the system, for example, during post processing. Location and identities are values that may include further analysis once the call has been completed.

In order to generate a desired output, a signature based deep packet inspection may not be sufficient. Deep packet inspection based on signatures may not be able to differentiate different types of the encrypted traffic (for example, voice, text, file share or the like). The system and method detailed herein may benefit from techniques such as machine learning and flow behavior analysis since sub classification of encrypted data may depend on understanding flow characteristics and session dynamics.

In at least some embodiments, behavioral correlation allows the system to provide traffic classification to link together associated flows spanning a plurality of protocols. As a simple example, consider a DNS request for YouTube™, followed by an SSL exchange to known YouTube™ servers. If these are the only two flows observed during a particular period, then it can be stated with very high confidence that these flows are related. If there are many flows happening concurrently, as is more likely the case, then correctly associating related flows becomes significantly more challenging. When it comes to machine learning, the system and associated network devices use supervised machine learning models that may be, for example, pre-trained in-house and validated for accuracy. These proprietary models and techniques are built upon a variety of different flow parameters, which would be understood in the art. Employing these techniques, the system is able not only to broadly classify encrypted traffic into categories (for example, Web Browsing, Video Streaming, VoIP, and the like) and classify unique applications within categories (for example, Facebook™ vs. Instagram™, WhatsApp™ vs. Lime™, Netflix™ vs. YouTube™, and the like). These techniques are intended to be used even when the traffic is encrypted and ESNI is in use.

Figure 5:
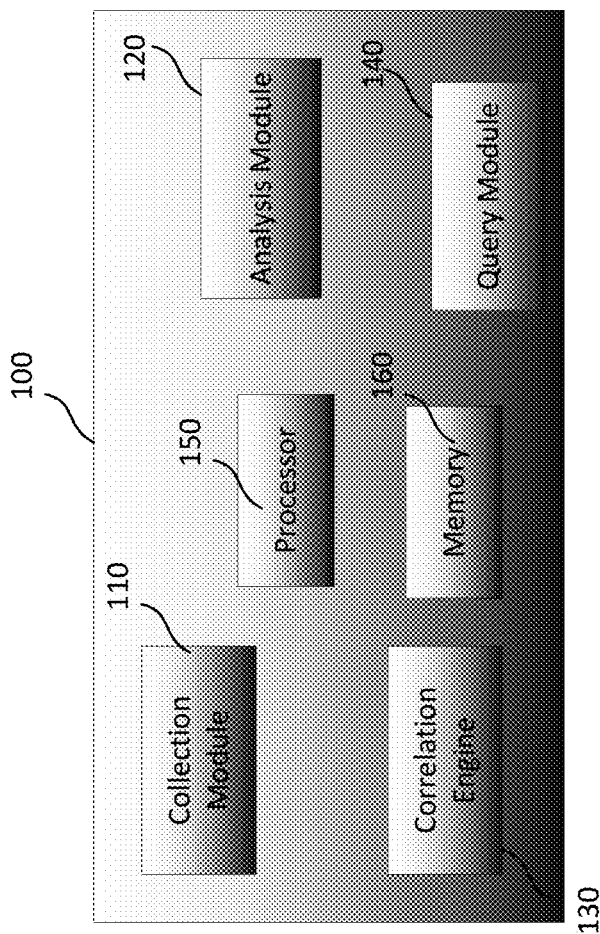
FIG. 5 illustrates a system for classifying VoIP calls according to an embodiment.

FIG. 5 illustrates an embodiment of a system 100 for classifying Voice over IP traffic flows. The system includes a collection module 110, an analysis module 120, a correlation engine 130, a query module 140, at least one processor 150 and at least one memory component 160. The system is generally intended to reside on the core network but may be distributed and may be inline with the traffic flow or may be offline and receive data from another network device. The modules, including the processor 150 and memory 160, are in communication with each other but may be distributed over various network devices or may be housed within a single network device. The processor may be configured to retrieve stored instruction from the memory 160 and execute the instructions that provide for the functionality of the modules. The system 100 is intended to receive information from the computer network equipment that allows the system to determine traffic flow metrics, including deep packet inspection data such as application type, session metrics (for example, timestamps, bitmasks and the like) and the like.

The collection module 110 is configured to collect various traffic metric measurements associated with a traffic flow and an IP session of a subscriber. The collection module 110 may further be configured to determine subscriber data associated with the IP session, for example, MSISDN, IMEI, IMSI/ADSL username, or the like and may further collect data such as client IP address, server IP address, port number, location data, incoming and outgoing bitmasks, and the like. Incoming and outgoing bitmasks of a flow is intended to be reviewed on either side of a record to determine whether the incoming data in one record appears to be similar in such that it provides a match to the outgoing data of the second side of a record. The collection module 110 is intended to collect this information on encrypted data flows to determine the VoIP traffic flows. Every VoIP Over The Top (OTT) call is intended to generate 4 separate detail records about the data streams, incoming and outgoing patterns for both sides of the call. From the perspective of a single side, there is incoming and outgoing streams that may be used when data bitmasks are compared for correlation purposes.

The analysis module 120 is configured to determine further traffic session metrics (sometimes referred to as parameters) associated with the IP session. Additional raw data records associated with call activity may be used in order to normalize call attributes and generate consolidated single side call record that may be used for correlation as detailed herein. The raw data records may include detailed information about at least some of the traffic session parameters including, for example, application, time, flow bitmasks and the like. The analysis module 120 may determine protocol or application of the traffic flow and may be configured to store data associated with traffic flows that match VoIP parameters and disregard other flows. In some cases, the analysis module 120 may disregard non-encrypted VoIP traffic flows as it is the encrypted VoIP traffic flows where determining correlations have been shown to be more difficult. In some cases, the analysis module may further determine a start time and end time of the traffic flow. In some cases, the analysis module may further consolidate the raw data which is intended to provide normalized data to be used for correlation of the records as detailed herein.

The correlation engine 130 is configured to determine correlations between IP sessions. The correlation engine 130 is configured to determine matching or correlated Internet Protocol Detail Records (IPDRs) to provide for a single Call Detail Record (CDR) as detailed herein. In some cases, the correlation engine 130 may find one to none, one to one or one to many relationships for IPDRs. In some cases, the correlation engine 130 may be configured to determine a confidence level associated with the correlation based on for example, the matched parameters such as time stamps or bitmasks.

The query module 140 is configured to perform queries for particular CDRs or for flagged subscribers based on data received by a law enforcement agency or other legal authority. The query module 140 may search or review the records stored in a memory component to determine whether any CDRs or IPDRs meet the criteria in the query.

Figure 6:
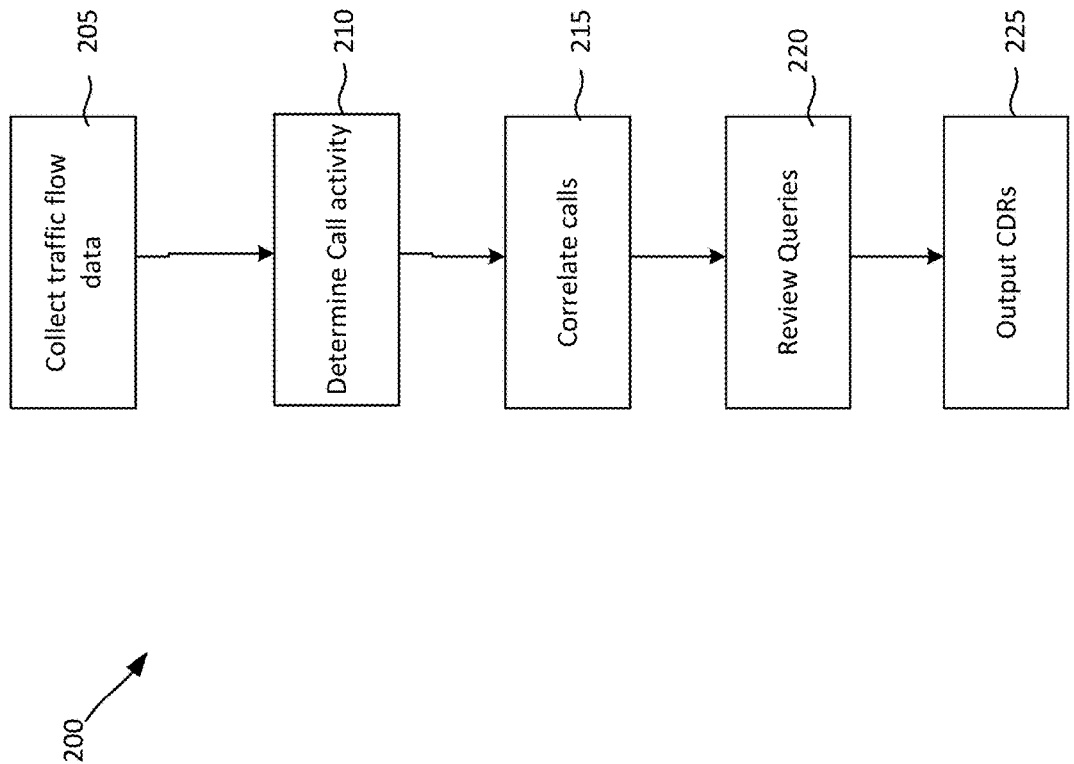
FIG. 6 illustrates a method for classifying VoIP calls according to an embodiment.

FIG. 6 illustrates a method for classifying Voice over IP calls according to an embodiment. At 205, the collection module is configured to collect traffic flow data with respect to an IP session. The collection module 110 is further configured to collect data related to the subscriber, the location and other available parameters of the IP session that may not be encrypted. At 210, the analysis module 120 is configured to determine whether the IP session is a call or other type of IP activity. The analysis module 120 is configured to determine protocol and data flow to determine whether the traffic flow is more likely to be a call or other activity. The analysis module may determine whether an encrypted traffic flow is likely to be a VoIP traffic flow given the IP activity and traffic flow parameters. The analysis module may consolidate any raw data in order to generate normalize data used for the correlations.

At 215, the correlation engine 130 is configured to determine matching or correlating IP sessions in order to have both sides of the call. In some cases, the correlation engine 130 may determine the other side of the call. In other cases, there may be a plurality of possible options for the second side of the call. In still other cases, there may not be a second record available, as detailed herein. In some cases, the correlation engine 130 may provide a confidence estimate or level based on the perceived accuracy of any correlation.

At 220, the query module 140 may receive or have stored a query with respect to call parameters. The query module 140 may be configured to search the records, as detailed herein, in order to determine whether there is any CDRs that match the query parameters. At 225, the query module 140 may provide or transmit at least on CDR that matches the query parameters.

Embodiments of the system and method detailed herein are intended to provide for inspection of a region or country's data, which is intended to maximize the results. In some cases, subscriber mapping may be provided on a country level. Mapping between cell IDs (and preferably DSLAM location) and geo coordinates for various service providers in the country may be provided by the system and method. On a high level, embodiments of the system and method are configured to process all the data and extract records that match the following ruleset:

Protocol=Targeted OTT Application(s)
Activity=Voice call

Once the system determines that the criteria to generate a record are met, at least one record may be generate at the end of the call and may contain at least some of the following information:

Protocol
Timestamps
Client IP address
Server IP address
Port numbers
Identities (MSISDN, IMEI, IMSI)/ADSL username (which is not registered OTT application number)
Location (Cell ID or DSLAM)
Amount of data (incoming and outgoing packets/octets)
Flow Bitmasks
and the like.

Other details may be added or stored based on available flow attributes.

Extracted fields may be a combination of the details collected from both control and data plane associated with the traffic flow and may be extracted from encrypted traffic flows. Depending on the user management protocol, the system is configured to be capable of extracting attributes linked to a specific identity (for example, mobile number, APN, connecting node, cell ID, of the like). IP address may also be considered an identity attribute as well as a key piece of information that links control and data plane. Based on this key value (IP address) all sessions in the data plane can be linked to all associated attributes for the subscriber holding IP address on the control plane. In a more challenging environment, data plane might be processing the flows after NAT (Network Address Translation), hiding original IP address assigned to a subscriber in order to preserve IP address space. If control plane management is added NAT logs in real time, the system is intended to be capable of identifying the owners (subscribers) for each IP flow passing data plane even in post NAT environment.

Records are generally generated for all calls identified on processed data, and stored in a database. The system may be configured to include a specific IPDR generation ruleset granularity to enable front-end to generate records only for a very specific fine-tuned criteria. This is important variable when it comes to back-end scalability and elimination of irrelevant data and noise. It is intended, with the ability to extract useful information and disregard the additional noise or irrelevant data, the system is intended to offer more optimized back-end design and reduce the required resources needed. In some cases, in order to minimize the footprint needed to store the data, there may be several stages of normalization introduced for the raw extracted data.

Figure 7:
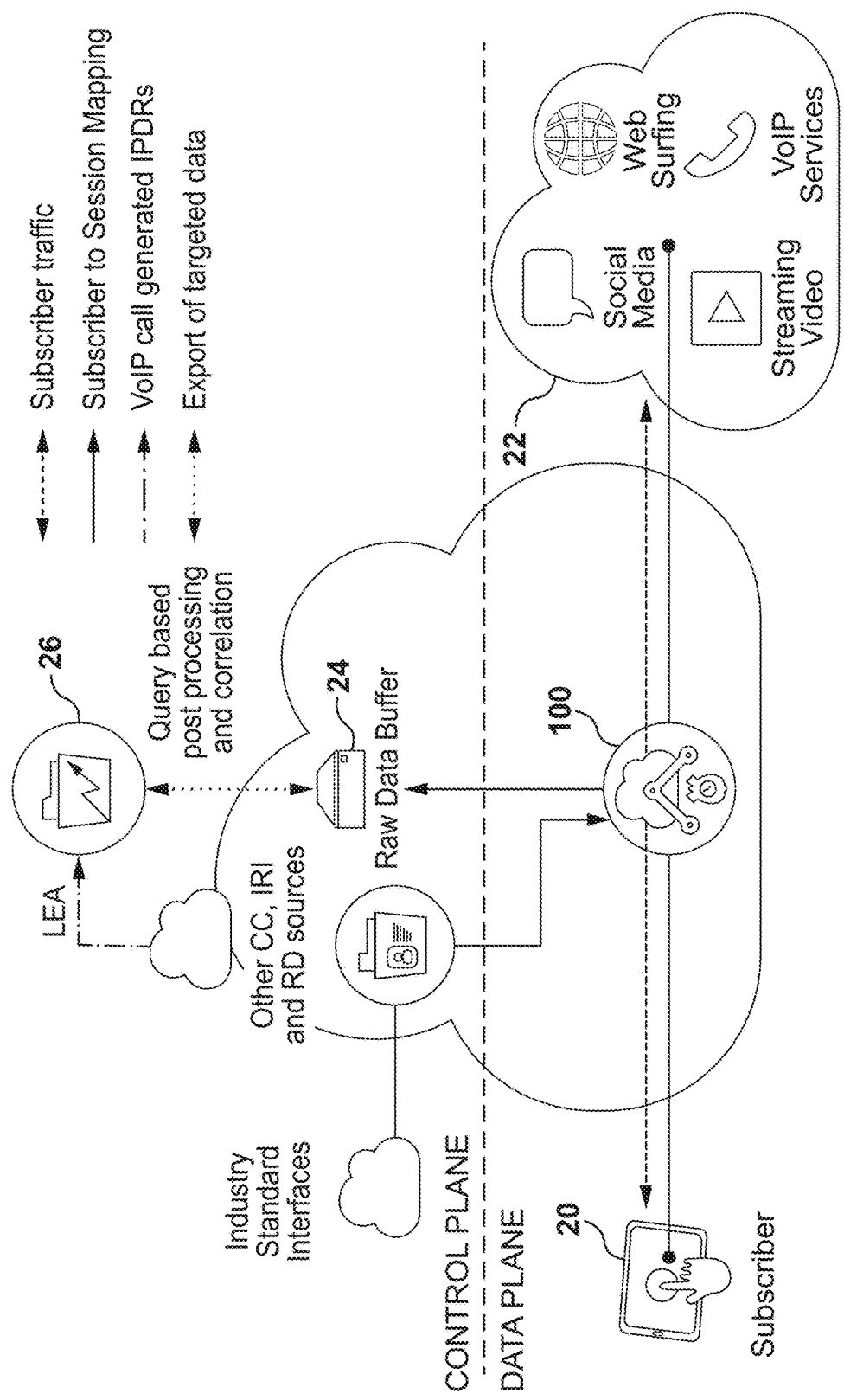
FIG. 7 illustrates a system for classifying VoIP in a network environment, according to an embodiment.

FIG. 7 illustrates an embodiment of the system in an inline mode. The system 100 may sit inline with the subscriber 20 and may collect and review data between the subscriber and the internet 22, for example reviewing social media, web surfing, streaming video, VoIP calling and the like. The system 100 may be operatively connected to a raw data buffer 24 or other memory or data store and may provide for storing the IPDRs. The system 100 may further map the IPDRs to the subscriber in view of the subscriber traffic as detailed herein. Further, an LEA 26 may query the system based on post processing and correlations as detailed herein to determine or receive a CDR based on the mapped and correlated IPDRs. In some cases, the system 100 may generate reports to be transmitted to or otherwise sent to be reviewed by an LEA in the case where there is mapping to known criminal elements, persons of interest, or otherwise flagged data. In some cases, the data may be presented or displayed in a visual format to provide detail to the LEA with respect to the CDR data.

The system may determine various scenarios when generating or reviewing and searching CDRs. In some cases, for queried criteria both parties of the call may be successfully identified and CDR may have all fields populated for both (Identities—MSISDN/IMSI/IMSI, location—CeIIID/DSLAM, protocol—OTT app, duration in seconds, and the like). In other cases, for queried criteria only one side of the call may be identified (single IPDR without matching second leg). The system may provide information that queried parameter found a match and partial output is presented containing only single party metadata (Identity—MSISDN/IMSI/IMSI, location—CeIIID/DSLAM, protocol—OTT app, duration in seconds)—for example, international call. In another cases, for queried criteria multiple IPDRs matched the correlation process, and system may not be able to distinguish which are parties in a single call (only two sides possible or conference). The system may provide for output to show all possible combinations that could have happened (with queried criteria being involved as at least one side of the call), however, makes a clear differentiation, that all these scenarios represent a single call, and it may not be clear as to which parties are in the particular call. CDRs generated by this scenario may be flagged or otherwise identified in order to differentiate these results from the match that may have been found in other cases. Further, in some cases, no IPDR record may contain any information matching queried criteria. Based on the confidence and matched variables, the system, and in particular the correlation engine, may be configured to distinguish different confidence factors related to the accuracy of any correlation (for example, time compared to bitmask)

Figure 8:
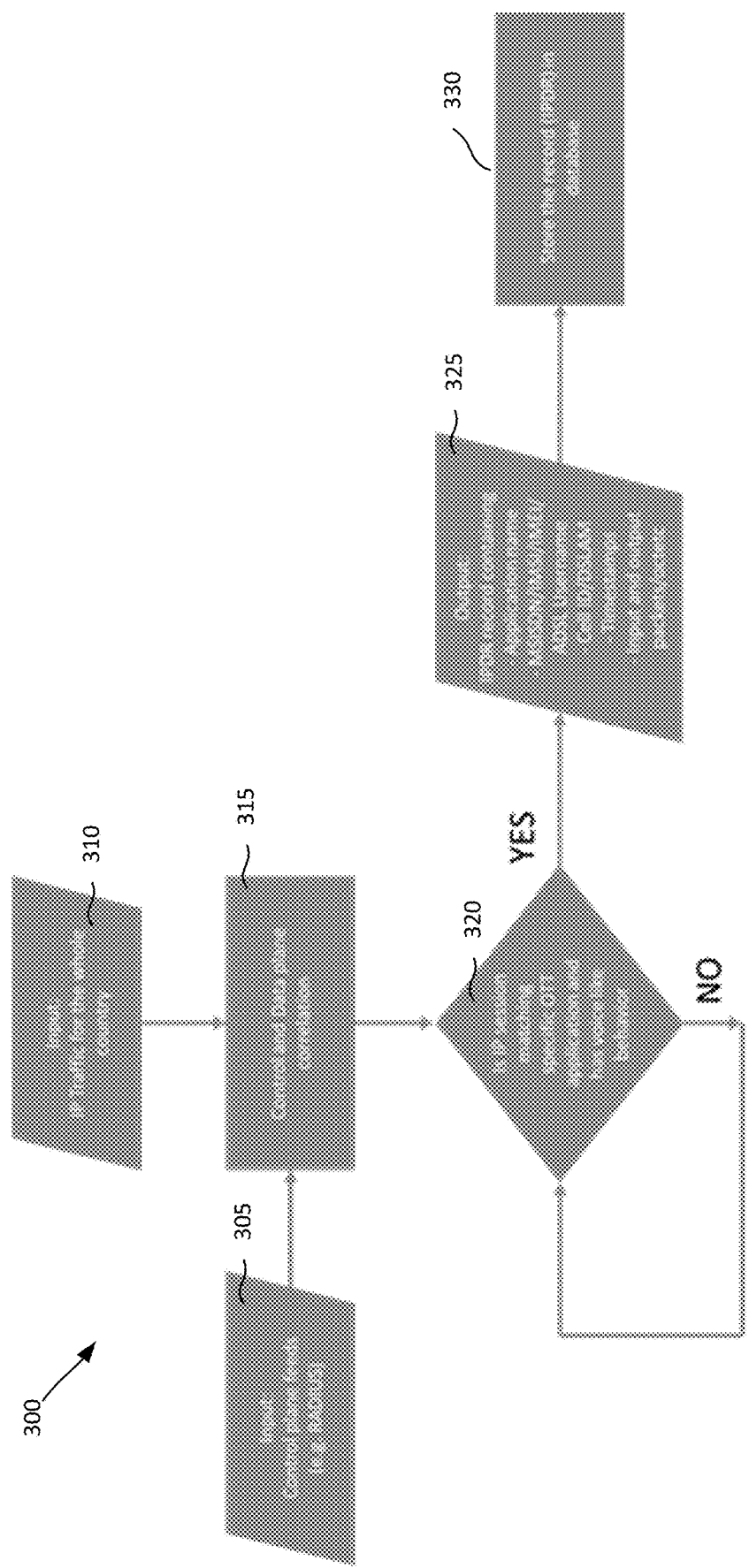
FIG. 8 illustrates a method for Front-End processing to obtain IPDRs according to an embodiment.

FIG. 8 is a flow chart for an embodiment of a method 300 for Front-End processing to obtain IPDRs where each represents a single leg (half) of the VOIP call. In some cases, there may be input from both the data plane and the control plane.

For the control plane input, service providers within the jurisdiction or country may follow certain procedures and protocols to manage their subscribers. Every device connecting to a network, requesting a certain service has a set of identities which may be used to uniquely determine ownership (for example, MSISDN) and many other details such as device itself (for example, IMEI), location (for example, Cell ID) and the like. As the system and method are intended to be focused on OTT voice over IP services, the system may differentiate between two general sets of subscribers: fixed and mobile users. Various parameters determined or retrieved from the control plane, at 305, for both fixed and mobile users are shown in FIG. 9. These parameters may be retrieved from encrypted traffic flows. It will be understood that control plane data is not intended to be required for correlation. In some cases, the correlation process may be completed on an IP level and any result may be a more abstract CDR with IP address as identities.

Embodiments of the system are intended to provide clear representation when it comes to the location. In particular, the system is intended to clearly pin a location of a subscriber on a map via address or coordinates. There are various protocols used for subscriber management (for example: RADIUS, DHCP, CGNAT logs, fixed IP assignments and the like). The system is intended to provide for subscriber awareness and various subscriber management methods may be used to provide insight into a subscriber associated with each IP session on the data plane. Additionally, subscriber data may be enriched by data collected by 3rd party systems (for example, dedicated location tracking solution, IMEI database, or the like).

Further input may be received from the data plane, at 310. At 315, the control and data plane data may be correlated. Generally, complete IP traffic for the entire network (for example, the country) is processed by enhanced deep packet inspection elements. Every session may be checked against targeted application with voice traffic flow behavior, using inspection techniques covering wide range of described options: signatures, behavior analysis, machine learning and the like, at 320. Once matched, at 325, the system may generate output as a single message with main parameters as follows:

Application name
Identities
Location
Start timestamp
Stop timestamp
Amount of data exchanged
Bitmasks
or the like.

Generated raw data over a plurality of records may be consolidated as part of unique call information into a single side record.

At 330, the system is configured to store each IPDRs over a pre-defined retention period, which may be defined by the service operator, by a law enforcement agency, or the like. When a query is executed, the correlation engine 130 is intended to search for IPDRs containing queried parameter.

The system may be configured to receive a query to identify all call records specific for a person of interest even if the person is availing themselves of OTT voice over IP. The system and method is intended to provide authorities the ability to investigate, track suspects, or generate new leads.

Figure 10:
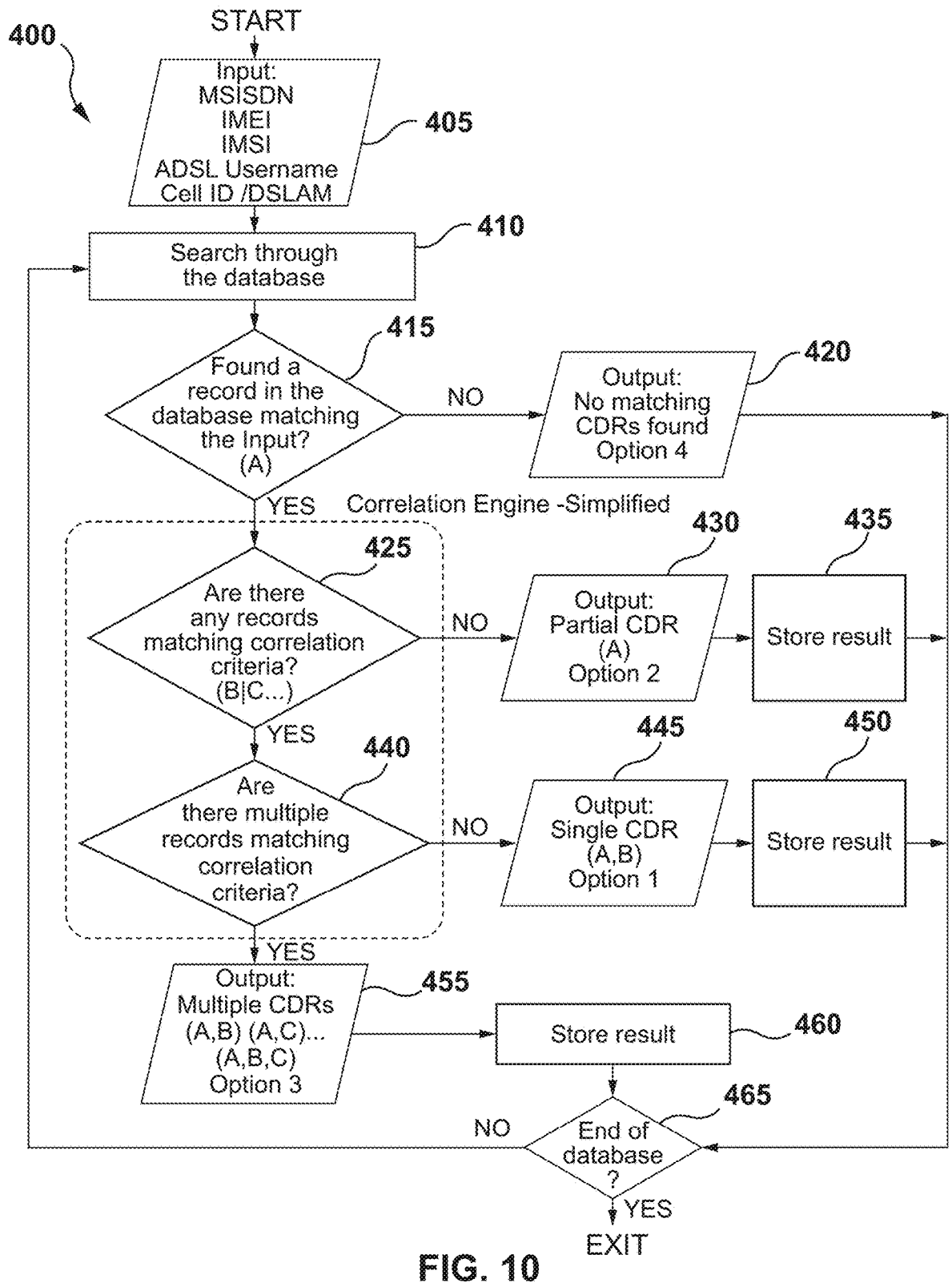
FIG. 10 is a flowchart illustrating a method of querying the system according to an embodiment.

FIG. 10 illustrates an embodiment of a method 400 for querying the system for classifying VoIP traffic flows. When the system is queried, the query module will start with any information related to a specific identity, for example, a person or location of interest and time, or the like, at 405. Time can be specified in general as a full retention period, but may also be a fine tuned option for more specific time windows. In a specific example, a query may be associated with a phone number—MSISDN, as to get the answer: "Who are MSISDNs targeted MSISDN talked to, as they could be involved in a malicious activity and part of investigation?"

In some cases, a person of interest can be represented as a device, mobile number, ADSL username, cell ID, IP address, or any other information retrieved from the control plane or otherwise depicting a person of interest, which can be received by the system as input. Once at least one query parameter, or parameter of interest is defined, the system is intended to search through the database, at 410, in order to see are there any records matching queried parameters, at 415. In case there are 0 records, that would suggest there was no activity for targeted identity within specified time period, meaning suspect did not make any calls at all and there will be no matching CDRs and no output will be delivered, at 420.

If record matching queried criteria is found, that would suggest, there was an activity of interest, and a call may have been made, at 425. This record now has to be compared, via for example, correlation criteria, against other records in order to identify who was other side of the call. In a specific example, a user may have an MSISDN=12345678 and makes a call over OTT voice application A at 08:00:00 am with call duration of 1 minute. The system is intended to now inspect all records generated within a predetermined time interval, for example, between 07:59:50 and 08:00:10 for application A. There are many records available for suggested time slot, however, it is expected if general prerequisites are met, there will be a record generated 08:00:01 with exact same duration of 1 minute. Small drift in time can be caused by network latency. It will be understood that the system is intended to have a much higher granularity than second range.

In some cases, there may be no records that would match correlation criteria with original record matching queried parameters that may imply that the other side of the call was not processed by the system, which means the other side of the call may reside in another network, without any visibility (for example, the call may have been an international call to some other country).

In some cases, there may be a single record matching correlation criteria with the original record with queried parameters, at 430. The system may correlated the matching record and return a CDR having both sides of the call identified to the law enforcement agency or the authority requesting the query, at 435.

In some cases, there may be a plurality of records matching the correlation criteria, at 440. The reasons for a plurality of matches may be, for example, false positives, and the system may not be able to present outcome with the same level of accuracy. In some cases, the system may flag, at 445, or otherwise mark and store these results, 450. With references to the previously noted specific example, there is a chance two random identities made a call at 08:00:00 with 1 minutes with matching bitmasks (traffic patterns). In that case, there may be three candidates as potential B side of the call. Output of such scenario would list all possible candidates, and clearly make distinction that using best effort methods the B side of the party is one of the identities. It is then up to investigation to determine, and potentially eliminate some of the candidates, if further information is not available.

Once correlation for a found record with queried parameters is finished at 455, results will be stored and the system may continue looking for further records with queried parameters, and if found, will repeat the correlation process until all such records in the database or otherwise store in memory, at 460, are processed, at 465.

Figure 11:
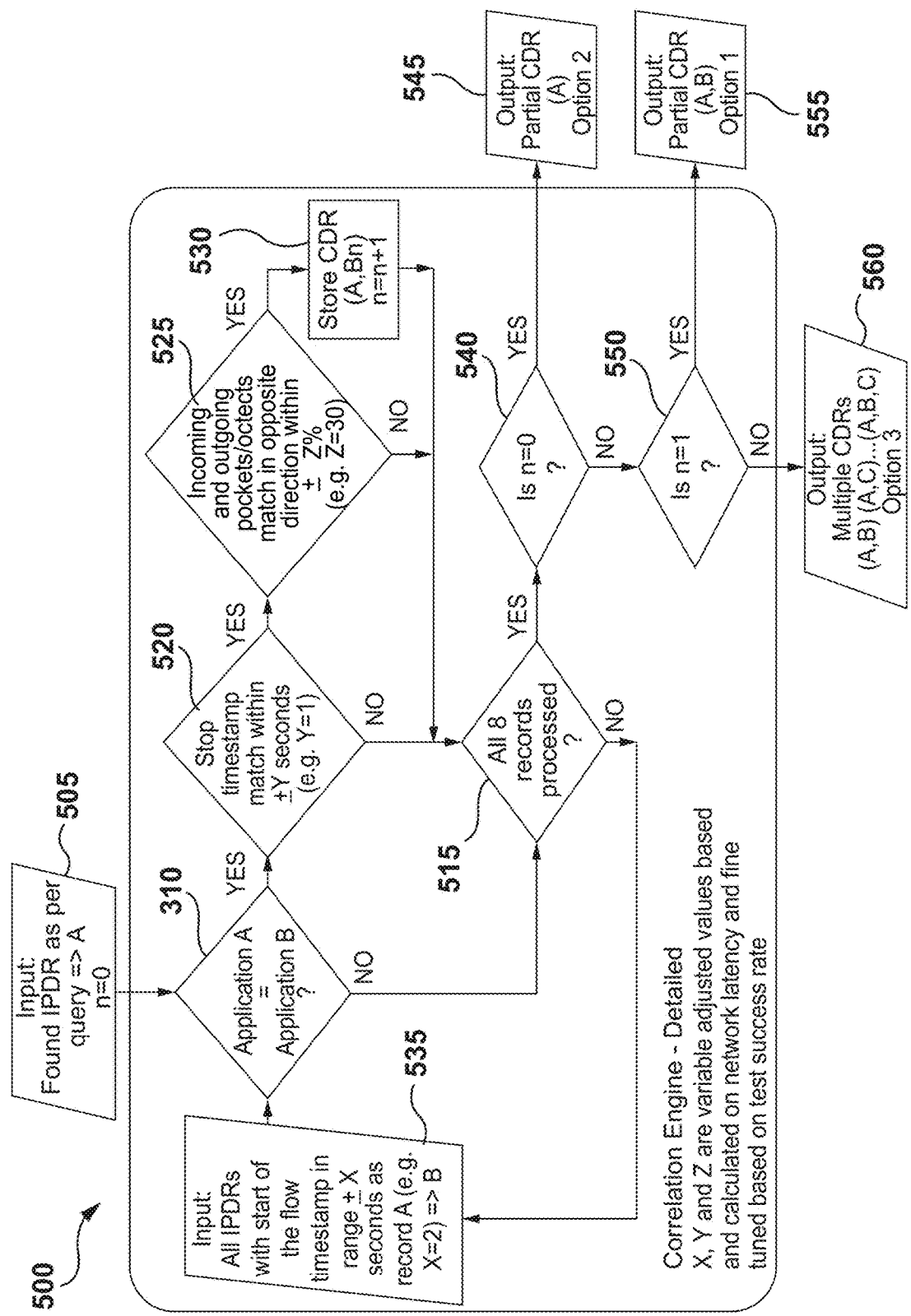
FIG. 11 is a flowchart illustrating a method for correlating records according to an embodiment.

FIG. 11 illustrates a method 500 for processing queries according to an embodiment. As each record containing queried parameters is intended to also include a timestamp, the system may only attempt to correlate records which have a start timestamps in the time proximity, within a predetermined time interval, for example, within 1 second, 2 seconds, 5 seconds, 15 seconds of the start time, or the like. The predetermined time interval is not intended to be fixed, and with lower latency, it can be reduced to improve the system performance optimizing the process. With less reliable networks, this predetermined time interval may be higher to make sure potential qualified records for correlation criteria are covered. It will be understood that the system is able to determine with high degree of accuracy that other records are not valid candidates for the CDR, and may not be processed.

When a voice call is made, focus is on real time data flows covering incoming and outgoing streams for both parties. Two people cannot engage in a voice call if one side will hear what the other person said 10 minutes later. One of the most important characteristics of the call is quick, fault tolerant exchange of smaller amount of data in real time. Due to the nature of the voice call over IP, the system is able to conclude that call starts and ends in close timeframe, and IP sessions are released in order to save resources on the network. Once user A closes the call, call will be close for user B almost instantly or shortly thereafter. In some rare cases, the closure of a call may not terminate the session, a bitmask of the call may be used to normalize the call duration. As such, there may be no need to run the correlation module against records that have a start timestamp, for example, 10 seconds, 30 seconds, or the like, after start timestamp of the record containing queried parameters. This predetermined time interval may be selected based on an understanding of the network with added safety threshold, which is intended to ensure that a CDR is not generated because matching record was excluded from the correlation process.

Today's computer networks are very complex, and therefor packets can travel via different paths to reach the packet destination. Networks are being used for many purposes, and network elements used are managing the traffic with limited resources available. A data plane processing layer may span across multiple links. Due to the network latency, packet loss and fragmentation, the system may assume there could be a deviation not only on a timestamp level (X and Y), but also, depending on the access network type, packet count and total data exchanged (Z). As the system may be used over different technologies, such as for example cellular data, broadband internet access, or even satellite, latency can vary in a wide ranges from less than 10 ms to 1000 ms. Fragmentation and packet loss may also heavily depend on the underlying technology being used. As a factor for correlation, bitmasks may be used to unify data exchange dynamic with time, giving even more granular parameter that summed up figures for the different data directions.

Once an initial window of qualified IPDR records is set (X), at 505, those records are may be processed by the correlation module. The system is configured to support a plurality of different OTT applications at once, application details do not have to match, at 510. In case they do not match, then different services may have been used, and the candidate currently being reviewed and compared may be disqualified from the correlation, at 515.

At this point in the process, the correlation module may compared start timestamp and application, at 520. If both criteria are met, the correlation module may continue by reviewing stop timestamp of the candidate against record with queried parameters. If the stop time does not matched, that would imply the current record belongs to a call that started at the same time, using the same OTT provider, however the current record was finished before or after the targeted call and is unlikely to be a correct match.

In case both timestamps and application identified match, amount of data may also be compared, at 525. It is expected incoming packets and data amount on one leg will match within variable Z range on outgoing packets and data on other record and vice versa for both directions. Using bitmask in order to match different directions of the same call is intended to give improved data exchange accuracy over time.

If all criteria met, the system is configured to consolidate the IPDRs into a single CDR record that will contain control plane information from both identities, at 530. As a control variable, in order to track and distinguish partial CDR compared to single CDR compared to multiple CDRs for a single record with queried parameters, a parameter n may be introduced. This parameter is intended to be used as a control variable that identifies scenarios where more than a single B side party may be identified. Based on various conditions matched, the correlation engine is intended to determine various confidence factors on generated CDRs. In specific examples, all timestamps and application match may be almost 100% confident, without any found false positives, however, if a bitmask does not match the system may still produce a CDR, however, the produced CDR may have a lower confidence factor than match including 100% in both, time and bitmask.

The method is intended to repeat for all remaining records within the predefined timeframe, at 535, and any outcome may be determined as a potential match and a potential outputs. It is then determined if the control variable is equal to 0, at 540, in which the output would be a partial CDR with one sided information, at 545. If the control variable is equal to 1, at 550, it would imply a single second side of the communication was found and a CDR may be constructed and sent or otherwise outputted as the response to the query, at 555.

If the control variable is higher than 1, the plurality of possible CDRs may be provided as the output, at 560. In this case, the output would include an identifier that a plurality of options have been found.

Whenever a CDR is generated the CDR is intended to include all relevant parameters (metadata) from both legs (IPDRs), which is intended to identities, application, time, IP address, location, and the like.

Embodiments of the system and method are intended to take the advantage of powerful existing traffic identification capabilities, via, for example, deep packet inspection and the like. The system identification may be based not only on signatures alone, but rather heuristics and machine learning, which is intended to offer better results, and understanding, even for encrypted traffic flows. Without advanced classification techniques, provided by the system and method detailed herein, it may not be possible to extract traffic of interest from the general data flows and then handle the data associated with that traffic in a way that allows tracking of the traffic flows.

In order to protect user's privacy, extracted "half" records (or IPDRs) may be stored in a dedicated database, and may be excluded from other automated correlation and analytical modules. As an end result, it is intended that querying may be comparing and reviewing, the data related to specific people of interest, which is intended to preserve privacy of general users of the computer network.

The system is intended to parse through time sorted IPDR records and look for all records matching the various criteria and save the data to a memory or database for further review, analysis, reporting or the like. Other records with the following types of parameters may be valid candidates for normalization, for example, if the candidates have:

Same protocol;
Same timestamp with minimal deviation;
Same call duration with minimal deviation; and/or
Same amounts of data exchanged via bitmask analysis.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for handling Voice over Internet Protocol (VOIP) traffic flows on a computer network, the method comprising:
    collecting traffic flow data with respect to an IP session;
    collecting parameters associated with the IP session, where in the parameters comprise traffic flow bitmaps;
    determining whether the IP session is a VoIP session;
    correlating IP sessions having similar parameters to the collected parameters of the VOIP session based at least in part on the traffic flow bitmaps and on network latency and packet loss; and creating at least one Internet Protocol Detail Record (IPDR) or Call Detail Record (CDR) based on the correlated IP session parameters.

2. The method of claim 1, further comprising:
storing the parameters associated with the VOIP session;
receiving a request, from a third party device, to query the stored records based on a parameter of interest;
querying the stored parameters to determine at least one record matching with the parameter of interest; and
providing any results that match the parameter of interest, to the third party device.

3. The method of claim 2, wherein if there is more than one record matching the parameter of interest, providing an indication that a plurality of records match the parameter of interest.

4. The method of claim 2 wherein the parameters, comprise subscriber attributes, call start time, call end time, IP address, location, device information, and application type.

5. The method of claim 4 wherein a record is determined to be a match if the call start time and call end time are within a predetermined time interval of each other.

6. The method of claim 5 wherein the predetermined time interval is based on the network latency.

7. The method of claim 2 wherein the third party device is associated with a law enforcement authority.

8. The method of claim 2, wherein storing the parameters associated with the VOIP comprises consolidating raw data to generate normalize the data.

9. The method of claim 1, further comprising determining a confidence level of the created record.

10. The method of claim 1, wherein the IP sessions originated from the same jurisdiction.

11. A system for handling Voice over Internet Protocol (VOIP) traffic flows on a computer network, the system comprising at least one processor configured to execute instructions stored in a memory component wherein the instructions provide for modules comprising:
a collection module configured to collect traffic flow data with respect to an IP session;
an analysis module configured to collect parameters associated with the IP session to determine whether the IP session is a VoIP session, wherein the parameters comprise traffic flow bitmasks; and
a correlation engine configured to correlate [P sessions having similar parameters to the collected parameters of the VOIP session based at least in part on the traffic flow bitmasks and on network latency and packet loss; and create at least one Internet Protocol Detail Records (IPDR) or Call Detail Records (CDR) based on the correlated IP session parameters.

12. The system according to claim 11, further comprising:
a memory component configured to store the parameters associated with the VoIP session, and
a query module configured to receive a request, from a third party device, to query the stored records based on a parameter of interest, query the stored parameters to determine at least one record matching with the parameter of interest; and provide any results that match the parameter of interest, to the third party device.

13. The system of claim 12, wherein the third party device is associated with a law enforcement authority.

14. The system of claim 13, wherein the query module is configured to provide an indication that a plurality of records match the parameter of interest if there is more than one record matching the parameter of interest.

15. The system of claim 11, wherein the parameters comprise subscriber attributes, call start time, call end time and application type.

16. The system of claim 15, wherein a record is determined to be a match if the call start time and call end time are within a predetermined time interval of each other.

17. The system of claim 16, wherein the predetermined time interval is based on the network latency.

18. The system of claim 11, wherein the IP sessions originated from the same jurisdiction.

19. The system of claim 13, wherein the analysis module is configured to consolidate raw data to generate normalize the data.

20. The system of claim 11, wherein the correlation engine is further configured to determine a confidence level of the created record.

* * * * *

UNITED STATES PATENT AND TRADEMARK OFFICE
CERTIFICATE OF CORRECTION

| | | |
|---|---|---|
| PATENT NO. | : 12,143,530 B2 | Page 1 of 1 |
| APPLICATION NO. | : 17/380299 | |
| DATED | : November 12, 2024 | |
| INVENTOR(S) | : Marko Sopic et al. | |

It is certified that error appears in the above-identified patent and that said Letters Patent is hereby corrected as shown below:

In the Claims

Column 14, Lines 62 and 67, Claim 1, the word 'bitmaps' should read -bitmasks-.

Signed and Sealed this
Twenty-fifth Day of March, 2025

Coke Morgan Stewart
*Acting Director of the United States Patent and Trademark Office*